(12) United States Patent
Yagi

(10) Patent No.: US 8,257,831 B2
(45) Date of Patent: Sep. 4, 2012

(54) GLASS-CERAMICS

(75) Inventor: Toshitaka Yagi, Sagamihara (JP)

(73) Assignee: Ohara Inc., Sagamihara-shi (JP)

( * ) Notice: Subject to any disclaimer, the term of this patent is extended or adjusted under 35 U.S.C. 154(b) by 580 days.

(21) Appl. No.: 12/108,109

(22) Filed: Apr. 23, 2008

(65) Prior Publication Data

US 2008/0268295 A1 Oct. 30, 2008

(30) Foreign Application Priority Data

Apr. 27, 2007 (JP) ................................ 2007-118586

(51) Int. Cl.
*B32B 17/00* (2006.01)
*C03C 10/12* (2006.01)
(52) U.S. Cl. ............... 428/426; 428/432; 501/4; 501/7
(58) Field of Classification Search .............. 428/426, 428/432; 501/4, 7
See application file for complete search history.

(56) References Cited

U.S. PATENT DOCUMENTS

| | | | | |
|---|---|---|---|---|
| 5,691,256 A * | 11/1997 | Taguchi et al. | ............... | 501/63 |
| 5,726,108 A * | 3/1998 | Taguchi et al. | ............... | 501/5 |
| 5,804,520 A * | 9/1998 | Morinaga et al. | ............... | 501/4 |
| 5,872,069 A * | 2/1999 | Abe | ............... | 501/5 |
| 5,972,816 A * | 10/1999 | Goto | ............... | 501/4 |
| 6,124,223 A * | 9/2000 | Beall et al. | ............... | 501/4 |
| 6,332,338 B1 * | 12/2001 | Hashimoto et al. | ............... | 65/29.21 |
| 6,344,423 B2 * | 2/2002 | Goto et al. | ............... | 501/4 |
| 6,376,402 B1 * | 4/2002 | Pannhorst et al. | ............... | 501/66 |
| 6,387,509 B1 * | 5/2002 | Goto et al. | ............... | 428/426 |
| 6,399,527 B1 * | 6/2002 | Kishimoto et al. | ............... | 501/69 |
| 6,426,311 B1 * | 7/2002 | Goto et al. | ............... | 501/4 |
| 6,495,480 B1 * | 12/2002 | Goto | ............... | 501/4 |
| 6,514,890 B1 * | 2/2003 | Nagata et al. | ............... | 501/4 |
| 6,649,549 B2 * | 11/2003 | Nagata et al. | ............... | 501/5 |
| 2003/0039771 A1 * | 2/2003 | Hachitani et al. | ............... | 428/1.32 |

FOREIGN PATENT DOCUMENTS

| | | |
|---|---|---|
| JP | 07-247138 A | 9/1995 |
| JP | 11-314939 A | 11/1999 |
| JP | 2001-287966 A | 10/2001 |
| JP | 2003-192385 A | 7/2003 |

OTHER PUBLICATIONS

Japanese Office Action dated Oct. 20, 2009, issued in corresponding Japanese Patent Application No. 2007-118586.
Japanese Office Action dated Mar. 16, 2010, issued in corresponding Japanese Patent Application No. 2007-118586.

* cited by examiner

*Primary Examiner* — Jennifer McNeil
*Assistant Examiner* — Lauren Robinson
(74) *Attorney, Agent, or Firm* — Westerman, Hattori, Daniels & Adrian, LLP

(57) ABSTRACT

Glass-ceramics include $SiO_2$, $Al_2O_3$ and $Li_2O$ on oxide basis. In the glass-ceramics, total amount in mass % of $SiO_2$ and $Al_2O_3$ is less than 77% and $Li_2O/(SiO_2+Al_2O_3)$ which is the ratio in mass % of the amount of $Li_2O$ to the total amount of $SiO_2$ and $Al_2O_3$ is 0.064 or over. The glass-ceramics include at least one crystal phase selected from the group consisting of β-quartz, β-quartz solid solution, β-eucryptite, β-eucryptite solid solution, β-spodumene and β-spodumene solid solution.

14 Claims, 1 Drawing Sheet

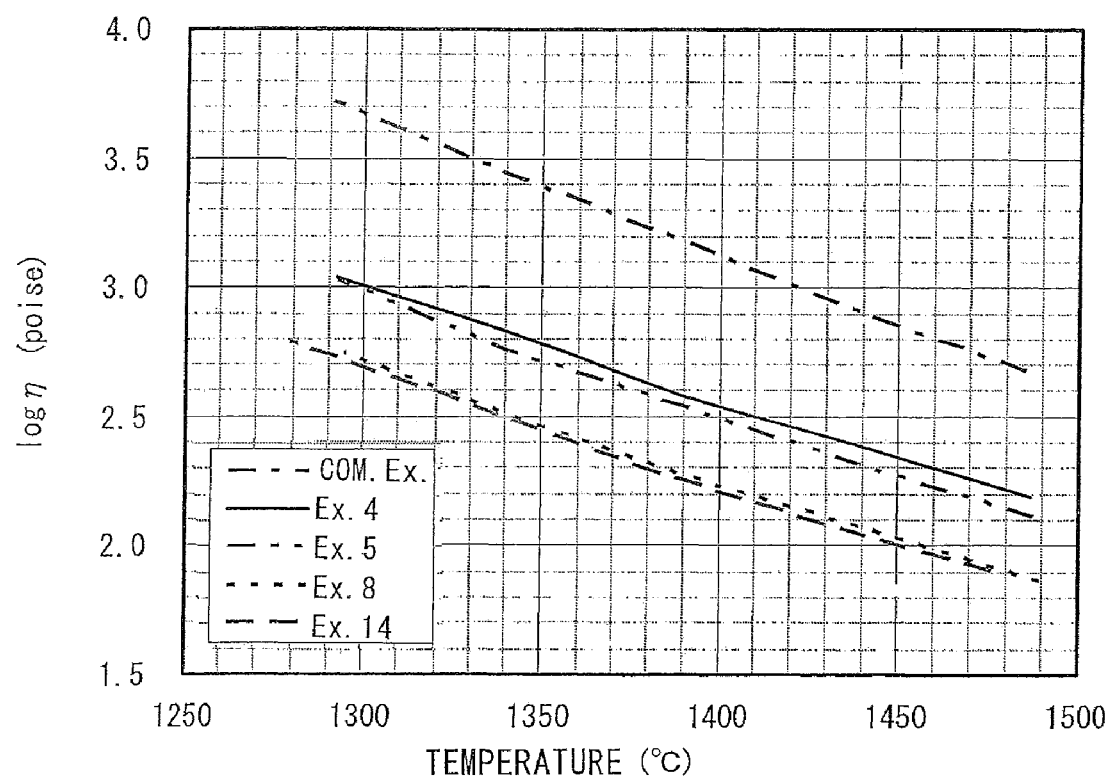

GLASS-CERAMICS

BACKGROUND OF THE INVENTION

This invention relates to glass-ceramics and, more particularly, to glass-ceramics for a substrate of a magnetic information storage medium. The invention particularly provides glass-ceramics which have a high heat resisting property capable of adapting to high temperature film forming and high temperature annealing, super flatness in the surface of a substrate, low solving out of alkali components from the substrate material during high temperature film forming and high temperature annealing, and a low viscosity capable of adapting to press molding on a mass production basis which are particularly suitable for a vertical magnetic recording medium, a patterned medium and a discrete track medium among magnetic information storage medium substrates used in various magnetic information storage devices.

In the present specification, the term "magnetic information storage medium" means a magnetic information storage medium which can be used for a stationary hard disk, a removable hard disk or a card type hard disk used as a hard disk of a personal computer, a hard disk of a digital video camera, a digital camera or an audio device, a hard disk for a car navigation, a hard disk of a mobile phone or a hard disk of various electronic devices.

Recent development of personal computers for multi-media purposes and requirement for digital video cameras and digital cameras to handle a large amount of data such as a moving picture require a magnetic information storage device of a large recording capacity. For increasing the recording density, there is a tendency in the art of a magnetic information storage medium toward reducing the size of a bit cell. As a result, the magnetic head performs its operation in closer proximity to the disk surface.

Moreover, as the recording density has come to exceed 100 Gb/in$^2$, such small magnetization unit becomes thermally instable and hence the surface recording system has reached its limits physically for the requirement for a high recording density exceeding 100 Gb/in$^2$.

For coping with this situation, there is a tendency to adopting the vertical magnetic recording system. Since the easy axis of magnetization runs in vertical direction in this vertical magnetic recording system, the bit size can be reduced significantly. Moreover, since the medium can have a desired film thickness (five folds to tend folds that of the surface recording system) in the vertical magnetic recording system, advantage of reducing a demagnetizing field and advantage of magnetic anisotropy due to configuration can be expected. For these reasons, the vertical magnetic recording system can solve the problems of reduction in recording energy and thermal instability occurring in increasing recording density in the prior art magnetic recording system in the surface direction and realize a recording density which is by far higher than the surface magnetic recording system. Thus, by the vertical magnetic recording system, a recording density of 100 Gb/in$^2$ or over on a practical level has already become possible on a mass production basis and studies are being carried out about a recording density exceeding 300 Gb/in$^2$.

Since magnetization is carried out in vertical direction against the surface of a medium in the vertical magnetic recording system, a medium having the easy axis of magnetization in vertical direction is employed instead of the easy axis of magnetization in the surface direction used in the prior art magnetic recording system. As storage layers used in the vertical magnetic recording system on which studies and efforts for practical implementation are being carried out can be cited a barium ferrite film and various alloy films including Co-$\gamma$Fe$_2$O$_3$, Fe alloys such as FePt and Ni alloys.

It is necessary in such magnetic storage medium to increase a film forming temperature for producing finer crystal grains of a crystal constituting the magnetic substance and causing the crystal to precipitate in vertical direction. Further, according to recent studies, there are cases in which annealing must be conducted at a high temperature in the order of 500° C. to 900° C. for improving magnetic characteristics. Therefore, a substrate material should preferably resist to such high temperature without occurrence of deformation of the substrate and change in the surface roughness.

It is also preferable that such magnetic storage medium should be free of crystal anisotropy, foreign matters and impurities and have a dense, uniform and fine texture. It is also preferable that such magnetic storage medium should have sufficient chemical durability for resisting to rinsing and etching by various chemicals.

In the prior art magnetic disk substrates, aluminum alloy is often used. In the aluminum alloy, however, unevenness in the form of projections or spots tends occur on the surface of the substrate in the polishing process and hence a substrate having sufficient flatness cannot be obtained. Moreover, since the aluminum alloy is soft and tends to be deformed, it is difficult to make the substrate thin. Furthermore, the disk made of aluminum alloy tends to cause a head crush due to deflection during a high speed rotation of the disk resulting in causing damage to a storage medium. Therefore, the aluminum alloy is not a material which can cope sufficiently with the future tendency toward a higher recording density. Besides, since heat resistance of the aluminum alloy during film forming is less than 300° C., film forming at a temperature of 300° C. or over and annealing at a high temperature in the order of 500° C. to 900° C. cause thermal deformation of the substrate. Therefore, it is difficult to use a substrate made of aluminum alloy as a substrate of a magnetic information storage medium requiring treatment at such a high temperature.

As an amorphous glass substrate and a chemically tempered glass substrate are known, for example, substrates of chemically tempered soda lime glass (SiO$_2$—CaO—Na$_2$O) and alumino-silicate glass (SiO$_2$—Al$_2$O$_3$—Na$_2$O). In these substrates, however, heat resisting property of the substrates is low because they are made of amorphous glasses. In other words, there is a problem of deformation due to film forming of a magnetic information storage medium that, when a magnetic information storage medium is provided on these substrates by film forming at a temperature of 300° C. or over, flatness of the substrates is deteriorated. Further, alkali components in the substrates are solved out and cause damage to the film.

Known in the art of glass-ceramics used for a magnetic information storage medium are several glass-ceramics. For example, Japanese Patent Application Laid-open Publication No. 2000-302481 discloses SiO$_2$—Li$_2$O—P$_2$O$_5$ type glass-ceramics comprising lithium disilicate (Li$_2$O.2SiO$_2$) and α-quartz as predominant crystal phases and having excellent physical properties and flatness as a magnetic information storage medium. The glass-ceramics, however, are disadvantageous in that they have a low heat resisting property and cause change in the precipitating crystal phases at a temperature exceeding 500° C. Japanese Patent Application Laid-open Publication No. Hei 09-35234 discloses a substrate for a magnetic information storage medium made of Li$_2$O—Al$_2$O$_3$—SiO$_2$ type glass-ceramics comprising β-spodumene and lithium disilicate. The glass-ceramics likewise have the problem of a low heat resisting property and cause change in the precipitating crystal phases at a temperature exceeding 500° C.

$Li_2O$—$Al_2O_3$—$SiO_2$ type glass-ceramics are also known to comprise at least one of β-quartz, β-quartz solid solution, ββ-eucryptite solid solution-eucryptite, β-spodumene and β-spodumene solid solution, have a sufficiently high heat resisting property as a vertical magnetic recording medium. Since, however, the glass-ceramics have a lower value of $Li_2O/(SiO_2+Al_2O_3)$, i.e., the ratio of amount of $Li_2O$ to the total amount of $SiO_2+Al_2O_3$ than the glass-ceramics of the present invention, they have a higher viscosity during melting of raw materials and are not suitable for press molding.

It is, therefore, an object of the present invention to provide glass-ceramics having excellent heat resisting property and mechanical property.

It is another object of the invention to provide highly productive glass-ceramics suitable for use as a magnetic disk substrate of a magnetic information storage medium which can be adapted to design and improvement of the above described magnetic information storage device and have good surface characteristic capable of coping with the ramp loading system for recording at a high recording density in both the surface magnetic recording system and the vertical magnetic recording system, have high sufficient strength for coping with high speed rotation and shock by falling, having thermal expansion property which is optimum for respective drive elements and excellent chemical durability, having a low melting temperature and adaptability to press molding.

SUMMARY OF THE INVENTION

Accumulated studies and experiments made by the inventor of the present invention for achieving the above described objects of the invention have resulted in the finding, which has led to the present invention, that glass-ceramics comprising $SiO_2$, $Al_2O_3$ and $Li_2O$ components and comprising also a specific crystal phase as a predominant crystal phase, wherein total amount in mass % of $SiO_2$ and $Al_2O_3$ is less than 77% and $Li_2O/(SiO_2+Al_2O_3)$ which is the ratio of amount in mass % of $Li_2O$ to the total amount in mass % of $SiO_2$ and $Al_2O_3$ is 0.064 or over are by far advantageous than the prior art glass-ceramics for achieving the above described objects of the invention. It has also been found that, by using the glass-ceramics of the present invention, a substrate can be provided which has sufficiently high strength for coping with high speed rotation of an information storage device, excellent shock resisting property suitable for mobile uses and excellent thermal expansion property which is adaptable easily to drive components.

It is preferable for the glass-ceramics of the present invention to comprise at least one crystal phase selected from the group consisting of β-quartz, β-quartz solid solution, β-eucryptite, β-eucryptite solid solution, β-spodumene and β-spodumene solid solution. These crystal phases have a high heat resisting property and excellent flatness of the surface after polishing by controlling the amount of precipitation of crystal grains and degree of crystallization and therefore are particularly suitable crystal phases.

In the first aspect of the invention achieving the object of the invention, there are provided: glass-ceramics comprising $SiO_2$, $Al_2O_3$ and $Li_2O$ on oxide basis, total amount in mass % of $SiO_2$ and $Al_2O_3$ being less than 77% and $Li_2O/(SiO_2+Al_2O_3)$ which is the ratio in mass % of the amount of $Li_2O$ to the total amount of $SiO_2$ and $Al_2O_3$ being 0.064 or over, and comprising at least one crystal phase selected from the group consisting of β-quartz, β-quartz solid solution, β-eucryptite, β-eucryptite solid solution, β-spodumene and β-spodumene solid solution.

In the second aspect of the invention, there are provided glass-ceramics as defined in the first aspect wherein logarithm log η of viscosity η (dPa·s) when the glass-ceramics are heated to 1400° C. is 3.0 or below.

In the third aspect of the invention, there are provided glass-ceramics as defined in the first aspect wherein average coefficient of linear thermal expansion within temperature range between 25° C. and 100° C. is −10 to 50 $[10^{-7}\text{° C.}^{-1}]$.

In the fourth aspect of the invention, there are provided glass-ceramics as defined in the first aspect wherein average crystal grain diameter of the crystal phase is 1 μm or below.

In the fifth aspect of the invention, there are provided glass-ceramics as defined in the first aspect having Young's modulus of 90 GPa or over.

In the sixth aspect of the invention, there are provided glass-ceramics as defined in the first aspect having ratio E/ρ of Young's modulus E to specific gravity ρ of 32 or over.

In the seventh aspect of the invention, there are provided glass-ceramics as defined in the first aspect comprising, in mass % on oxide basis:

| | |
|---|---|
| $SiO_2$ | 40-60% and |
| $Li_2O$ | 4-15% and |
| $Al_2O_3$ | 15-30%. |

In the eighth aspect of the invention, there are provided glass-ceramics as defined in the seventh aspect further comprising in mass % on oxide basis:

| | |
|---|---|
| MgO | 0-10% and/or |
| CaO | 0-10% and/or |
| ZnO | 0-10% and/or |
| BaO | 0-7% and/or |
| $K_2O$ | 0-7% and/or |
| $Na_2O$ | 0-7% and/or |
| $P_2O_5$ | 0-15% and/or |
| $ZrO_2$ | 0-5% and/or |
| $TiO_2$ | 0-5% and/or |
| $B_2O_3$ | 0-5% and/or | one or more components of $Gd_2O_3$, $La_2O_3$, $Y_2O_3$ and $Ga_2O_3$ in total amount of 0-10% and/or one or both of $Sb_2O_3$ and $As_2O_3$ in total amount of 0-2%.

In the ninth aspect of the invention, there are provided a substrate of a magnetic information storage medium using the glass-ceramics as defined in any of the first to eighth aspect.

In the tenth aspect of the invention, there is provided a substrate of a magnetic information storage medium having a compressive stress layer on the substrate as defined in the ninth aspect.

In the eleventh aspect of the invention, there are provided a substrate as defined in the tenth aspect wherein the compressive stress layer is formed by substituting by a cation having a larger ionic radius than ions contained in a surface layer of the substrate.

In the twelfth aspect of the invention, there is provided a substrate as defined in the tenth aspect wherein the compressive stress layer is formed by heating and subsequent quenching of the substrate.

In the thirteenth aspect of the invention, there is provided a substrate as defined in the ninth aspect having surface roughness Ra (arithmetic mean roughness) of 3A or below.

In the fourteenth aspect of the invention, there is provided a magnetic information storage medium using the substrate of a magnetic information storage medium as defined in any of the ninth to fourteenth aspect.

In the fifteenth aspect of the invention, there is provided a method for manufacturing glass-ceramics comprising:

a step of producing a mother glass by melting raw materials of glass and then quenching the mother glass so that the mother glass comprises $SiO_2$, $Al_2O_3$ and $Li_2O$ on oxide basis, total amount in mass % of $SiO_2$ and $Al_2O_3$ being less than 77% and $Li_2O/(SiO_2+Al_2O_3)$ which is the ratio in mass % of the amount of $Li_2O$ to the total amount of $SiO_2$ and $Al_2O_3$ being 0.064 or over;

a step of nucleation by heat treating the mother glass at a temperature within a temperature range from 600° C. to 750° C.; and a step of crystallization conducted subsequent to the nucleation step by heat treating the mother glass at a temperature higher than the temperature of the nucleation step within a temperature range from 650° C. to 850° C.

In the sixteenth aspect of the invention, there is provided a method as defined in the fifteenth aspect wherein the raw materials of the glass-ceramics comprise in mass % on oxide basis:

| | |
|---|---|
| $SiO_2$ | 40-60% and |
| $Li_2O$ | 4-15% and |
| $Al_2O_3$ | 15-30%. |

In the seventeenth aspect of the invention, there is provided a method as defined in the sixteenth aspect wherein the raw materials of the glass-ceramics further comprise in mass % on oxide basis:

| | |
|---|---|
| MgO | 0-10% and/or |
| CaO | 0-10% and/or |
| ZnO | 0-10% and/or |
| BaO | 0-7% and/or |
| $K_2O$ | 0-7% and/or |
| $Na_2O$ | 0-7% and/or |
| $P_2O_5$ | 0-15% and/or |
| $ZrO_2$ | 0-5% and/or |
| $TiO_2$ | 0-5% and/or |
| $B_2O_3$ | 0-5% and/or | one or more components of $Gd_2O_3$, $La_2O_3$, $Y_2O_3$ and $Ga_2O_3$ in total amount of 0-10% and/or one or both of $Sb_2O_3$ and $As_2O_3$ in total amount of 0-2%.

The composition of the components of the present invention is expressed in mass % and therefore cannot be expressed in mol % directly but, for performing the same effects as the above described structure, the composition of the components are expressed generally in mol % as follows:

In the eighteenth aspect of the invention, there are provided glass-ceramics in mol % on oxide basis

| | |
|---|---|
| $SiO_2$ | 45-55% and |
| $Li_2O$ | 9-23% and |
| $Al_2O_3$ | 7-23%. |

In the nineteenth aspect of the invention, there are provided glass-ceramics as defined in the eighteenth aspect wherein the glass-ceramics comprise in mol % on oxide basis:

| | |
|---|---|
| MgO | 0-17% and/or |
| CaO | 0-13% and/or |
| ZnO | 0-6% and/or |
| BaO | 0-4% and/or |
| $K_2O$ | 0-6% and/or |
| $Na_2O$ | 0-8% and/or |
| $P_2O_5$ | 0-7% and/or |
| $ZrO_2$ | 0-3% and/or |
| $TiO_2$ | 0-5% and/or |
| $B_2O_3$ | 0-5% and/or | one or more components of $Gd_2O_3$, $La_2O_3$, $Y_2O_3$ and $Ga_2O_3$ in total amount of 0-4% and/or one or both of $Sb_2O_3$ and $As_2O_3$ in total amount of 0-1%.

According to the present invention, by comprising $SiO_2$, $Al_2O_3$ and $Li_2O$ on oxide basis, total amount in mass % of $SiO_2$ and $Al_2O_3$ being less than 77% and $Li_2O/(SiO_2+Al_2O_3)$ which is the ratio in mass % of the amount of $Li_2O$ to the total amount of $SiO_2$ and $Al_2O_3$ being 0.064 or over, and comprising at least one crystal phase selected from the group consisting of β-quartz, β-quartz solid solution, β-eucryptite, β-eucryptite solid solution, β-spodumene and β-spodumene solid solution, glass-ceramics can be obtained which have a high heat resisting property capable of coping with film forming and annealing at a high temperature and super flatness of the substrate and therefore are suitable for a medium in which forming of a vertical magnetizing film necessary for realizing a future high recording density and other film formed at a high temperature is necessary. Since the glass-ceramics of the present invention have a low viscosity and therefore a low melting temperature, they have high adaptability to press molding and, as a result, productivity is improved and manufacturing cost is reduced. Further, according to the invention, a substrate having an excellent surface roughness after polishing and being particularly suitable for a magnetic information storage medium can be provided.

BRIEF DESCRIPTION OF THE DRAWING

In the accompanying drawing, FIG. 1 is a graph showing relation between logarithm log η of viscosity η (dPa·s) and temperature with respect to Examples Nos. 4, 5, 8 and 14 and Comparative Example. The temperature in FIG. 1 is temperature of a platinum crucible filled with glass melt in the measurement of viscosity.

DESCRIPTION OF PREFERRED EMBODIMENTS

Preferred embodiments of the invention will now be described.

A predominant crystal phase which precipitates in the glass-ceramics is an important factor which determines the coefficient for thermal expansion. A crystal phase having a negative coefficient of thermal expansion must be caused to precipitate in a glass having a positive coefficient of thermal expansion and thereby the glass-ceramics must have a coefficient of thermal expansion as a whole which is within a desired range. For this purpose, the glass-ceramics must comprise at least one crystal phase selected from the group consisting of β-quartz, β-quartz solid solution, β-eucryptite, β-eucryptite solid solution, β-spodumene and β-spodumene solid solution.

Solid solution herein means a crystal phase of β-quartz, β-eucryptite or β-spodumene in which a part of the crystal is substituted by an element other than an element which constitutes the crystal, or in which an atom is inserted between crystals. For example, β-eucryptite or β-spodumene in which a part of $Li_2O$ is substituted by MgO and/or ZnO is β-eucryptite solid-solution or β-spodumene solid-solution.

Description will now be made about components of the composition constituting the glass-ceramics of the present invention. The amount of each component is expressed in mass % on oxide basis. In the present specification, the term "on oxide bases" is used to express content of each component of the glass-ceramics and means that, assuming that oxides, carbonates, nitrates etc. which are used as raw materials of the glass-ceramics composition of the present invention have all been decomposed and converted to oxides during the melting process, each component of the glass comprises a particular ratio to the total mass of the converted oxides which is 100 mass %.

$SiO_2$ is an important component which precipitates the above described crystal phase as a predominant crystal phase by heat treating a mother glass. If the amount of this component is less than 40%, the precipitating crystal of the glass-ceramics obtained is instable and its texture tends to become gross and, as a result, mechanical strength tends to be deteriorated and the surface roughness after polishing tends to become large. The lower limit of the amount of this component therefore should preferably be 40%, more preferably be 42% and most preferably be 45%. On the other hand, if the amount of this component exceeds 60%, difficulty arises in melting and formability with resulting deterioration in homogeneousness. Therefore, the upper limit of the amount of this component should preferably be 60%, more preferably be 58% and most preferably be 55%.

$Al_2O_3$ is an important component which, like $SiO_2$, constitutes the predominant crystal phase and contributes also to stability of the glass. If the amount of this component is less than 15%, difficulty arises in vitrification and, therefore, the lower limit of the amount of this component should preferably be 15%, more preferably be 17% and most preferably be 19%. If the amount of this component exceeds 30%, difficulty arises in melting and formability and, therefore, the upper limit of the amount of this component should preferably be 30%, more preferably be 28% and most preferably be 26%.

It has been found that, in the glass-ceramics of the present invention, the total amount of $SiO_2$ and $Al_2O_3$ is a very important factor for stabilizing the glass and achieving low viscosity of the glass. If the total amount of these components is less than 55%, it is difficult to obtain a desired crystal phase or vitrify the raw materials. Therefore, the lower limit of the total amount should preferably be 55%, more preferable be 60% and most preferably be 65%. If the total amount is 77% or over, difficulty arises in melting and formability resulting in deterioration in homogeneousness and, therefore, the upper limit of the total amount should preferably be less than 77%, more preferably be 76.5% and most preferably be 76%.

$Li_2O$ is an important component which constitutes the above described crystal phase and contributes also to achieving low viscosity of the glass. If the amount of this component is less than 4%, these effects cannot be obtained sufficiently and, therefore, the lower limit of the amount of this component should preferably be 4%, more preferably be 4.2% and most preferably be 4.5%. If the amount of this component exceeds 15%, difficulty arises in obtaining a desired crystal phase and chemical durability is deteriorated and, therefore, the upper limit of the amount of this component should preferably be 15%, more preferably be 11% and most preferably be 9%.

In the glass-ceramics of the present invention, it has been found that $Li_2O/(SiO_2+Al_2O_3)$, i.e., the ratio in mass % of the amount of $Li_2O$ to the total amount of $SiO_2$ and $Al_2O_3$, is a very important factor for stabilization of the glass and achieving low viscosity of the glass. If this ratio is less than 0.064, viscosity of the mother glass during the melting process tends to become high and therefore unsuitable for press molding and difficulty arises in melting and formability with resulting deterioration in homogeneousness. The lower limit of this ratio therefore should preferably be 0.064, more preferably be 0.065 and most preferably be 0.066. If this ratio exceeds 0.140, it becomes difficult to obtain a desired crystal phase and, therefore, the upper limit of this ratio should preferably be 0.140, more preferably be 0.120 and most preferably be 0.100.

$P_2O_5$ may be optionally added as a nucleating agent. It is preferable to add this component because it contributes to making viscosity of the glass low and improves melting property and clarity of the mother glass by its coexistence with $SiO_2$. For attaining these effects sufficiently, the lower limit of the amount of this component should preferably be 4%, more preferably be 5% and most preferably be 6%. If the amount of this component exceeds 15%, it becomes difficult to vitrify the raw materials and there occurs tendency to devitrification and, therefore, the upper limit of the amount of this component should preferably be 15%, more preferably be 13% and most preferably be 11%.

$ZrO_2$ may be optionally added as a nucleating agent. Since this component contributes greatly to improvement of chemical durability and physical properties of the glass and also is effective for obtaining fine crystals, it preferable to add this component in an amount of 0.5% or over. If, however, the amount of this component exceeds 5%, this component tends to remain unmelted as $ZrSiO_4$. Therefore, the upper limit of the amount of this component should preferably be 5%, more preferably be 4.5% and most preferably be 4%.

$TiO_2$ may also be added optionally as a nucleating agent. Since this component contributes greatly to improvement of chemical durability and is also effective for obtaining fine crystals, it is preferable to add this component in an amount of 0.5% or over. If, however, the amount of this component exceeds 5%, $TiO_2$ precipitates as a crystal phase which makes it difficult to achieve a desired crystal phase. Therefore, the upper limit of the amount of this component should preferably be 5%, more preferably be 4.5% and most preferably be 4%.

For causing a desired crystal phase to precipitate, the total amount of one or more of $P_2O_5$, $ZrO_2$ and $TiO_2$ should preferably be 1% or over, more preferably be 1.5% or over and most preferably be 2% or over.

$B_2O_3$ contributes to making viscosity of the glass low and thereby improve melting property and formability and, therefore, may be added optionally within a range not to impair properties of the glass-ceramics. If the amount of this component is 5% or over, phase separation tends to occur in the mother glass and it becomes difficult to achieve a desired crystal phase and, therefore, the upper limit of the amount of this component should preferably be 5%, more preferably be 4.5% and most preferably be 4%.

$K_2O$ is effective for making crystal grains fine and making viscosity of the glass low and, therefore, may be added optionally. If the amount of this component exceeds 7%, it becomes difficult to vitrify the raw materials and to obtain a desired crystal phase. The upper limit of the amount of this component therefore should preferably be 7%, more preferably be 6.5% and most preferably be 6%.

$Na_2O$ is effective for making viscosity of the glass low and, therefore, may be added optionally. If the amount of this component exceeds 7%, it becomes difficult to vitrify the raw materials and to obtain a desired crystal phase. The upper limit of the amount of this component therefore should preferably be 7%, more preferably be 6% and most preferably be 5%.

MgO, CaO, BaO and ZnO are effective for making viscosity of the glass low and making crystal grains of precipitating crystal phase fine and, therefore, may be added optionally. If, however, the amount of MgO exceeds 10%, the amount of CaO exceeds 10%, the amount of BaO exceeds 7% and the amount of ZnO exceeds 10%, the precipitating crystal becomes instable and its texture becomes gross with the result that difficulty arises in obtaining a desired crystal phase and tendency to devitrification occurs in the mother glass. Therefore, the upper limit of the amount of MgO should preferably be 10%, more preferably be 9% and most preferably be 8%. The upper limit of the amount of CaO should preferably be 10%, more preferably be 5% and most preferably be 3%. The upper limit of the amount of BaO should preferably be 7%, more preferably be 5% and most preferably be 3%. The upper limit of the amount of ZnO should preferably be 10%, more preferably be 7% and most preferably be 5%.

$Sb_2O_3$ and $As_2O_3$ are effective as a refining agent and therefore may be added optionally. The total amount of one or both of these components up to 2% will suffice. Therefore, the upper limit of the total amount of these components should preferably be 2%, more preferably be 1.5% and most preferably be 1%.

Since $As_2O_3$ is a component which is harmful for the environment, use of this component should be avoided if possible. The glass-ceramics of the present invention can attain a refining effect without containing $As_2O_3$ and, therefore, it is preferable not to add $As_2O_3$.

$Gd_2O_3$, $La_2O_3$, $Y_2O_3$ and $Ga_2O_3$ are effective for making viscosity of the glass low, improving mechanical properties by improving Young's modulus and elevating crystallizing temperature, i.e., improving heat resisting property and, therefore, may be respectively added optionally. The total amount of one or more of these components up to 10% will suffice and, if the total amount exceeds 10%, it becomes difficult to vitrify the raw materials. Therefore, the upper limit of the total amount of these components should preferably be 10%, more preferably be 7% and most preferably be 5%.

Description will be made about surface characteristics of the glass-ceramics. As described previously, as the surface recording density of an information storage medium increases, height of the head above the surface of the information storage medium has recently been lowered to 15 nm or below and in future will be lowered to 10 nm or below and further the recording system will proceed to the near contact recording system and further to the contact recording system in which the head comes completely in contact with the surface of the information storage medium. For coping with this situation, flatness of the surface of the disk substrate must be improved from the prior art substrate.

When an attempt is made to input and output a magnetic signal at a high recording density to and from a magnetic information storage medium having flatness of the prior art level, such input and output of a magnetic signal cannot be made because distance between the head and the medium is too large. If it is attempted to reduce this distance, projections on the surface of the medium (disk substrate) collide with the head and thereby cause damage to either the head or the medium. For preventing damage to the head or the disk substrate or sticking between the head and medium even in such extremely low flying height or contact state of the head, the upper limit of surface roughness Ra (mean arithmetic roughness) should preferably be 3 Å, more preferably be 2.5 Å and most preferably be 2 Å. For realizing such flat surface after polishing, the upper limit of average crystal grain diameter of the glass-ceramics should preferably be 1 μm, more preferably be 300 nm and most preferably be 100 nm. For achieving sufficient mechanical strength and heat resisting property, the lower limit of the average crystal grain diameter of the glass-ceramics should preferably be 1 nm.

By causing fine crystal grains to precipitate uniformly, mechanical strength of the glass-ceramics can be improved. Particularly, since the precipitating crystal grains prevent growth of fine cracks, minute defects caused by chipping or the like occurring in the polishing process can be reduced significantly.

Further, by causing such fine crystals to precipitate uniformly and also by forming a compressive stress layer on the surface of the glass-ceramics, mechanical strength, particularly ring bending strength of the glass-ceramics can be remarkably improved. From these standpoints, the average crystal grain diameter should preferably be set in the above described range.

By such arrangements, when, for example, the glass-ceramics are used as a substrate such as a substrate of a magnetic information storage medium, the surface recording density can be increased and, even when the substrate is rotated at a higher speed for increasing the recording density, flexion or deformation does not occur and vibration caused by such rotation is reduced and, as a result, the number of data reading error (TMR) due to vibration and flexion can be reduced. Moreover, since the glass-ceramics have an excellent shock resisting property, they exhibit excellent stability against head crash and damage to the substrate as an information storage medium such as an information storage medium for a mobile purpose.

The term "average crystal grain diameter" herein means a median ("median diameter" d50) of grain diameters on the surface basis measured by a transmission electron microscope (TEM) image. The term "ring bending strength" herein means a bending strength measured by the concentric circle bending method according to which a sample in the form of a thin disk having diameter of 65 mm and thickness of 0.635 mm is prepared and strength of this sample is measured by using a circular support ring and a loading ring.

Description will now be made about Young's modulus and specific gravity. As described previously, speed of rotation of an information storage medium disk substrate is becoming higher as the recording density and data transfer speed are improved. For coping with this tendency, a substrate material must have high rigidity and low specific gravity for preventing vibration of the disk occurring due to flexion during high speed rotation of the disk. Further, in a case where the substrate is used for a head which contacts the substrate in the contact recording system and in a case where the substrate is used for a mobile type recording device such as a removable recording device, the substrate material should preferably have sufficient mechanical strength for such uses, high Young's modulus and high surface hardness. Specifically, the glass-ceramics used for such substrate should preferably have Young's modulus of 90 GPa or over, more preferably 91 GPa or over and most preferably 92 GPa or over.

If the glass-ceramics have large specific gravity though they have high rigidity, flexion of a disk occurs during high speed rotation due to its large weight resulting in occurrence of vibration of the disk. Conversely, if the glass-ceramics have low rigidity though they have low specific gravity, vibration occurs similarly. On the other hand, if specific gravity is reduced excessively, it becomes difficult to achieve desired mechanical strength. Accordingly, apparently conflicting properties of high rigidity and low specific gravity must be balanced. The ratio of Young's modulus (GPa)/specific gravity should preferably be 32 or over, more preferably be 34 or over and most preferably be 36 or over. As to specific gravity, it should be 2.7 or below even if the glass-ceramics have high rigidity. If, however, specific gravity is less than 2.2, it becomes substantially difficult to obtain a substrate having desired rigidity.

As to average coefficient of linear thermal expansion, matching of average coefficients of linear thermal expansion with respective component parts of a hard disk was considered important in the past and a coefficient within a range from +70 $[10^{-7\circ} C.^{-1}]$ to +100 $[10^{-7\circ} C.^{-1}]$ within a temperature range from 25° C. to 100° C. was sought. There has recently been a tendency to less demand for such strict matching of average coefficients of linear thermal expansion by virtue of realizing of precision control of a head but it is still desirable that average coefficient of the substrate should be proximate to those of respective component parts to some extent. On the other hand, although mechanical strength of glass-ceramics tends to become high with increase of the amount of crystal grains, the crystal phase of the glass-ceramics of the present invention has a negative or low positive average coefficient of linear thermal expansion and, therefore, average coefficient of linear thermal expansion of the glass-ceramics as a whole tends to become low. From such standpoint, for uses as a magnetic information storage medium and for the purpose of balancing mechanical strength and matching of average coefficient of linear thermal expansion with component parts of a hard disk, the lower limit of average coefficient of linear thermal expansion within a temperature range from 25° C. to 100° C. should preferably be −10 $[10^{-7\circ} C.^{-1}]$, more preferably be −7 $[10^{-7\circ} C.^{-1}]$ and most preferably be −5 $[10^{-7\circ} C.^{-1}]$. For similar reason, the upper limit of average coefficient of linear thermal expansion should preferably be +50 $[10^{-7\circ} C.^{-1}]$, more preferably be +45 $[10^{-7\circ} C.^{-1}]$ and most preferably be +40 $[10^{-7\circ} C.^{-1}]$.

Since the glass-ceramics of the present invention have the above described average coefficient of linear thermal expansion, they are suitable for uses as various precision members for which thermal stability in size is required.

Viscosity of the glass-ceramics will now be described. In the glass-ceramics of the present invention, when glass is formed (e.g., by press molding) to a predetermined shape (e.g., in the form of a disk having an outer diameter of 68 mm and thickness of 1.0 mm), if viscosity is excessively high, the predetermined shape having the predetermined outer diameter and thickness cannot be obtained, i.e., its thickness becomes too large and its outer diameter becomes too small. For this reason, the upper limit of logarithm log η of viscosity η (dPa·s) when the glass-ceramics are heated to 1400° C. should preferably be 3.0, more preferably be 2.9 and most preferably be 2.7. On the other hand, if viscosity is too low, it becomes extremely difficult to adjust flow quantity of glass in accordance with weight of glass required for obtaining a predetermined shape and shear the flow of glass at a proper position. Therefore, the lower limit of log η should preferably be 1.6, more preferably be 1.8 and most preferably be 2.0.

Logarithm log η of viscosity η (dPa·s) when the glass-ceramics are heated to 1400° C. can be calculated by a ball pulling-up type viscosimeter (e.g., BVM-13LH made by Yugen Kaisha Opto Kigyo).

Description will now be made about the compressive stress layer.

By providing a compressive stress layer on the surface of the glass-ceramics of the present invention, mechanical strength which the glass-ceramics before provision of such compressive stress layer had can be improved.

For forming the compressive stress layer, there is chemical tempering according to which an ion contained in the surface layer of the glass-ceramics before provision of the compressive stress layer is substituted by a cation which has a larger ionic radius than such ions. There are also thermal tempering according to which the glass-ceramics are heated and then quenched and ion implantation according to which ions are implanted on the surface of the glass-ceramics.

For chemical tempering, glass-ceramics are soaked in a salt solution containing potassium and/or sodium, e.g., a salt solution of potassium nitrate ($KNO_3$) or sodium nitrate ($NaNO_3$) or a combined salt of these salts at a temperature within a range from 300° C. to 600° C. for 0.5 hour to 12 hours. By this treatment, an ion exchange reaction takes place between lithium ion ($Li^+$) existing in the surface layer of the residual glass component other than lithium ion constituting the crystal precipitating in the glass-ceramics and potassium ion ($K^+$) and/or sodium ion ($Na^+$) which is a cation having a larger ionic radius than lithium ion whereby volume of the glass-ceramics increases and compressive stress is generated in the surface layer of the glass-ceramics and, as a result, ring bending stress which is an index of shock property increases.

There is no limitation in thermal tempering. For example, by heating glass-ceramics to 300° C. to 600° C. and then quenching the heated glass-ceramics by water quenching and/or air quenching, a compressive stress layer can be formed due to difference in the temperature between the surface portion and the inside portion of the glass-ceramics. The compressive stress layer can be formed more effectively by combining thermal tempering with chemical tempering.

For manufacturing the glass-ceramics of the present invention, raw materials of the above described components are melted and quenched to form a mother glass. This mother glass is heated for nucleation at a temperature within a range from 600° C. to 750° C. and then is heated for crystallization at a higher temperature than the nucleation process within a range from 650° C. to 850° C.

EXAMPLES

Preferred examples of the present invention will be described below. It should be noted that the present invention in no way is limited to these examples.

Tables 1 to 4 show examples (Example Nos. 1 to 17) of compositions of the glass-ceramics made according to the present invention and a comparative example of a composition of the prior art glass-ceramics together with nucleating temperature (unit: ° C.), crystallizing temperature (unit: ° C.), crystal phase, crystal grain diameter (unit: nm), specific gravity, Young's modulus and average coefficient of linear thermal expansion (temperature range: 25° C. to 100° C., unit: $10^{-7\circ}$ $C.^{-1}$, expressed as CTE(25-100) in the tables). The comparative example is prior art β-quartz glass-ceramics disclosed in Japanese Patent Application Laid-open Publication No. Hei 11-314939.

In these tables, "nuc. temp." designates nucleating temperature, "cry. Temp." crystallizing temperature, "ACGD" average crystal grain diameter, "SG" specific gravity, "YM" Young's modulus and "s.s." solid solution respectively.

TABLE 1

| Component (mass %) | Example 1 | Example 2 | Example 3 | Example 4 | Example 5 |
|---|---|---|---|---|---|
| $SiO_2$ | 51.00 | 52.30 | 52.00 | 51.50 | 50.00 |
| $P_2O_5$ | 7.50 | 9.00 | 7.00 | 7.00 | 8.00 |
| $Al_2O_3$ | 21.20 | 22.00 | 23.70 | 24.00 | 24.00 |
| $B_2O_3$ | 3.00 | 0.00 | 0.00 | 0.00 | 0.00 |
| $Li_2O$ | 6.50 | 6.50 | 6.50 | 6.50 | 5.00 |
| $K_2O$ | 1.00 | 1.00 | 1.20 | 1.50 | 1.50 |
| $Na_2O$ | 0.00 | 0.00 | 0.00 | 0.00 | 0.00 |
| MgO | 2.00 | 2.00 | 2.00 | 2.50 | 3.50 |
| CaO | 1.00 | 1.00 | 1.00 | 1.00 | 1.50 |
| BaO | 1.00 | 1.00 | 1.00 | 1.00 | 1.00 |
| ZnO | 1.00 | 1.00 | 1.50 | 0.50 | 0.50 |
| $ZrO_2$ | 2.00 | 1.70 | 1.50 | 1.70 | 1.00 |
| $TiO_2$ | 2.30 | 2.00 | 2.10 | 2.30 | 1.50 |
| $La_2O_3$ | 0.00 | 0.00 | 0.00 | 0.00 | 2.00 |
| $Gd_2O_3$ | | | | | |
| $Y_2O_3$ | | | | | |
| $Ga_2O_3$ | | | | | |
| $Sb_2O_3$ | 0.50 | 0.50 | 0.50 | 0.50 | 0.50 |
| $As_2O_3$ | 0.00 | 0.00 | 0.00 | 0.00 | 0.00 |
| Total | 100.00 | 100.00 | 100.00 | 100.00 | 100.00 |
| $SiO_2 + Al_2O_3$ | 72.20 | 74.30 | 75.70 | 75.50 | 74.00 |
| $Li_2O/(SiO_2 + Al_2O_3)$ | 0.0900 | 0.0875 | 0.0859 | 0.0861 | 0.0676 |
| cry.temp | 660 | 660 | 660 | 660 | 620 |
| nuc.temp | 720 | 720 | 720 | 720 | 680 |
| crystal phase | β-spodumene β-quartz s.s. β-eucyptite s.s. | β-spodumene β-quartz s.s. | β-spodumene β-quartz s.s. β-eucyptite | β-spodumene β-quartz s.s. | β-quartz s.s. |
| ACGD(nm) | 30 | 30 | 30 | 30 | 30 |
| SG ρ | 2.51 | 2.51 | 2.51 | 2.51 | 2.55 |
| YM E | 95 | 95 | 96 | 95 | 93 |
| E/ρ | 37.8 | 37.8 | 38.2 | 37.8 | 36.5 |
| CTE(25-100) | 1 | 1 | −2 | −1 | 3 |

TABLE 2

| Component (mass %) | Example 6 | Example 7 | Example 8 | Example 9 | Example 10 |
|---|---|---|---|---|---|
| $SiO_2$ | 49.00 | 48.00 | 48.00 | 47.00 | 48.00 |
| $P_2O_5$ | 8.00 | 8.00 | 7.00 | 7.00 | 7.00 |
| $Al_2O_3$ | 23.50 | 22.50 | 23.00 | 22.50 | 22.50 |
| $B_2O_3$ | 0.00 | 0.00 | 0.00 | 0.00 | 0.00 |
| $Li_2O$ | 5.00 | 5.00 | 5.00 | 4.80 | 5.00 |
| $K_2O$ | 3.00 | 5.00 | 2.00 | 3.70 | 2.50 |
| $Na_2O$ | 0.00 | 0.00 | 0.00 | 0.00 | 0.00 |
| MgO | 3.50 | 3.50 | 5.00 | 5.00 | 5.00 |
| CaO | 1.50 | 1.50 | 1.50 | 1.50 | 1.50 |
| BaO | 1.00 | 1.00 | 1.00 | 1.00 | 1.00 |
| ZnO | 0.50 | 0.50 | 0.50 | 0.50 | 0.50 |
| $ZrO_2$ | 1.00 | 1.00 | 1.00 | 1.00 | 1.00 |
| $TiO_2$ | 1.50 | 1.50 | 1.50 | 1.50 | 1.50 |
| $La_2O_3$ | 2.00 | 2.00 | 4.00 | 4.00 | 4.00 |
| $Gd_2O_3$ | | | | | |
| $Y_2O_3$ | | | | | |
| $Ga_2O_3$ | | | | | |
| $Sb_2O_3$ | 0.50 | 0.50 | 0.50 | 0.50 | 0.50 |
| $As_2O_3$ | 0.00 | 0.00 | 0.00 | 0.00 | 0.00 |
| Total | 100.00 | 100.00 | 100.00 | 100.00 | 100.00 |
| $SiO_2 + Al_2O_3$ | 72.50 | 70.50 | 71.00 | 69.50 | 70.50 |
| $Li_2O/(SiO_2 + Al_2O_3)$ | 0.0690 | 0.0709 | 0.0704 | 0.0691 | 0.0709 |
| cry.temp. | 620 | 620 | 620 | 620 | 620 |
| nuc.temp. | 680 | 680 | 680 | 680 | 680 |
| crystal phase | β-spodumene β-quartz s.s. | β-spodumene | β-spodumene β-quartz s.s. | β-spodumene | β-spodumene |
| ACGD | 40 | 30 | 70 | 60 | 60 |
| SG ρ | 2.55 | 2.54 | 2.60 | 2.60 | 2.60 |
| YM E | 94 | 93 | 97 | 96 | 96 |

TABLE 2-continued

| Component (mass %) | Example 6 | Example 7 | Example 8 | Example 9 | Example 10 |
|---|---|---|---|---|---|
| E/ρ | 36.9 | 36.6 | 37.3 | 36.9 | 36.9 |
| CTE(25-100) | 11 | 30 | 9 | 26 | 20 |

TABLE 3

| Component (mass %) | Example 11 | Example 12 | Example 13 | Example 14 | Example 15 |
|---|---|---|---|---|---|
| $SiO_2$ | 48.00 | 48.00 | 48.00 | 48.00 | 48.00 |
| $P_2O_5$ | 7.00 | 7.00 | 7.00 | 7.00 | 7.00 |
| $Al_2O_3$ | 23.00 | 23.00 | 23.00 | 23.00 | 23.00 |
| $B_2O_3$ | 0.00 | 0.00 | 0.00 | 0.00 | 0.00 |
| $Li_2O$ | 5.00 | 5.00 | 5.00 | 5.00 | 5.00 |
| $K_2O$ | 2.00 | 2.00 | 2.00 | 2.00 | 0.00 |
| $Na_2O$ | 0.00 | 0.00 | 0.00 | 0.00 | 2.00 |
| MgO | 6.00 | 5.00 | 5.00 | 5.00 | 5.00 |
| CaO | 1.50 | 1.50 | 1.50 | 1.50 | 1.50 |
| BaO | 1.00 | 1.00 | 1.00 | 1.00 | 1.00 |
| ZnO | 0.50 | 0.50 | 0.50 | 0.50 | 0.50 |
| $ZrO_2$ | 1.00 | 1.00 | 1.00 | 1.00 | 1.00 |
| $TiO_2$ | 1.50 | 1.50 | 1.50 | 1.50 | 1.50 |
| $La_2O_3$ | 3.00 | | | | 4.00 |
| $Gd_2O_3$ | | 4.00 | | | |
| $Y_2O_3$ | | | 4.00 | | |
| $Ga_2O_3$ | | | | 4.00 | |
| $Sb_2O_3$ | 0.50 | 0.50 | 0.50 | 0.50 | 0.50 |
| $As_2O_3$ | 0.00 | 0.00 | 0.00 | 0.00 | 0.00 |
| Total | 100.00 | 100.00 | 100.00 | 100.00 | 100.00 |
| $SiO_2 + Al_2O_3$ | 71.00 | 71.00 | 71.00 | 71.00 | 71.00 |
| $Li_2O/(SiO_2 + Al_2O_3)$ | 0.0704 | 0.0704 | 0.0704 | 0.0704 | 0.0704 |
| cry. Temp. | 620 | 620 | 720 | 620 | 620 |
| nuc. Temp. | 680 | 680 | 780 | 680 | 680 |
| crystal phase | β-spodumene | β-spodumene | β-spodumene | β-spodumene | β-spodumene β-quartz s.s. |
| ACGD | 60 | 60 | 60 | 70 | 60 |
| SG ρ | 2.59 | 2.60 | 2.60 | 2.56 | 2.61 |
| YM E | 97 | 95 | 98 | 94 | 98 |
| E/ρ | 37.5 | 36.5 | 37.7 | 36.7 | 37.5 |
| CTE(25-100) | 15 | 19 | 12 | 15 | 14 |

TABLE 4

| Component (mass %) | Example 16 | Example 17 | Comparative Example |
|---|---|---|---|
| $SiO_2$ | 48.00 | 51.50 | 55.00 |
| $P_2O_5$ | 7.00 | 7.00 | 8.00 |
| $Al_2O_3$ | 23.00 | 24.40 | 24.00 |
| $B_2O_3$ | 0.00 | 0.00 | |
| $Li_2O$ | 5.00 | 7.50 | 4.00 |
| $K_2O$ | 1.00 | 1.20 | |
| $Na_2O$ | 1.00 | 0.00 | |
| MgO | 5.00 | 2.00 | 1.00 |
| CaO | 1.50 | 1.00 | 1.00 |
| BaO | 1.00 | 1.00 | 1.00 |
| ZnO | 0.50 | 1.00 | 0.50 |
| $ZrO_2$ | 1.00 | 1.00 | 2.00 |
| $TiO_2$ | 1.50 | 1.60 | 2.50 |
| $La_2O_3$ | 4.00 | 0.30 | |
| $Gd_2O_3$ | | | |
| $Y_2O_3$ | | | |
| $Ga_2O_3$ | | | |
| $Sb_2O_3$ | 0.50 | 0.50 | |
| $As_2O_3$ | 0.00 | 0.00 | 1.00 |
| total | 100.00 | 100.00 | 100.00 |
| $SiO_2 + Al_2O_3$ | 71.00 | 75.90 | 79.00 |
| $Li_2O/(SiO_2 + Al_2O_3)$ | 0.0704 | 0.0988 | 0.0506 |
| cry. temp. | 620 | 620 | 700 |
| nuc. temp. | 680 | 680 | 780 |
| crystal phase | β-spodumene β-quartz s.s. | β-spodumene β-quartz s.s. β-eucyptite s.s. | β-quartz s.s. |
| ACGD | 60 | 30 | 40 |
| SG ρ | 2.61 | 2.51 | 2.50 |
| YM E | 98 | 95 | 90 |
| E/ρ | 37.5 | 37.8 | 36.0 |
| CTE(25-100) | 13 | −4 | 0 |

A measured viscosity curve was prepared by using the ball pulling-up type viscosimeter (BVM-13LH made by Yugen Kaisha Opto Kigyo) with respect to Example Nos. 4, 5, 8 and 14 and comparative example. Comparing the examples of the present invention with the comparative example, it will be understood that logarithm log η of viscosity η (dPa·s) when the glass-ceramics were heated to 1400° C. is below 3.0 in all of the above examples of the present invention thereby exhibiting that the glass-ceramics of the present invention have a sufficiently low viscosity property for coping with press molding on a mass production level whereas log η of the comparative example is 3.12 exhibiting that it does not have a sufficiently low viscosity.

A pressing test was conducted with respect to the glass of Example 4 and the glass of the comparative example. The temperature of the glass flowing nozzle was adjusted so that the temperature of the glass gob became 1400° C. and the glass was dripped on a female mold which was heated to a temperature in the vicinity of the glass transition temperature and then the glass was pressed with male and female molds. A glass disk having the target diameter of 67 mm and thickness of 1 mm was obtained from the glass of Example 4 whereas the glass disk obtained from the glass of the comparative example had a smaller diameter and a larger thickness than the target size, for the glass of the comparative example which had a higher viscosity did not expand sufficiently.

For producing the glass-ceramics of the examples of the present invention, raw materials such as oxides, carbonates and nitrates were mixed and melted at a temperature within a range from about 1400° C. to 1500° C. by a conventional melting apparatus. After homogenizing the melt by stirring it, the melt was formed to a disk and was cooled to provide a formed glass. The formed glass was then heat treated for nucleation at a temperature within a range from 600° C. to 750° C. for about one to twelve hours and then was heat treated again for crystallization at a higher temperature than the temperature in the nucleation process within a temperature range from 650° C. to 850° C. for about one to twelve hours and desired glass-ceramics were obtained. Then, the glass-ceramics were lapped for about 10 minutes to 60 minutes by using a grain having an average grain diameter of 5-30 μm and further were polished for about 30 minutes to 60 minutes by using cerium oxide having an average grain diameter of 0.5-2 μm to provide substrates of an information storage medium. The surface roughness Ra (mean arithmetic roughness) of the substrates was all 2 Å or below.

These substrates were soaked in potassium nitrate ($KNO_3$) within a temperature range from 300° C. to 600° C. for 0.5 hour to 12 hours to form a compressive stress layer on the surface of the substrates. It was confirmed that ring bending strength of these substrates increased by 1.5 fold to 5 folds from the substrates before the compressive stress layer was formed.

Substrates were produced from the glass of the comparative example in the same manner as in the glass of the examples to form a compressive stress layer similarly. Their ring bending strength was increased by 1.4 fold from the substrates before the compressive stress layer was formed, which was a lower value than that of the examples of the present invention.

A compressive stress layer was formed also on the surface of the substrates by quenching the substrates by air quenching after heating them to a temperature range from 300° C. to 600° C. It was also confirmed that ring bending strength of the substrates improved.

Industrial Utility

According to the invention, there are provided glass-ceramics having excellent heat resisting property and mechanical strength required for coping with the tendency toward high recording density in the future magnetic recording system, particularly vertical magnetic recording system, achieving a super flat surface required for improving crystal orientation of a film material when a film is formed on a substrate, and also having good chemical durability. Thus, the glass-ceramics of the present invention are useful as a substrate of a magnetic information storage medium, particularly as a substrate of a vertical magnetic recording type magnetic information storage medium for HDD.

What is claimed is:

1. Glass-ceramics comprising $SiO_2$, $Al_2O_3$ and $Li_2O$ on oxide basis,
    wherein the glass-ceramics contains in mass %

| | |
|---|---|
| $SiO_2$ | 40-60%, |
| MgO | 0-9%, |
| $TiO_2$ | 0-4.5%, and | one or both of $K_2O$ 1-7% and $Na_2O$ 1-7%,
wherein total amount in mass % of $SiO_2$ and $Al_2O_3$ is less than 77%, and
$Li_2O/(SiO_2+Al_2O_3)$ which is the ratio in mass % of the amount of $Li_2O$ to the total amount of $SiO_2$ and $Al_2O_3$ being 0.064 or over, and
the glass-ceramics comprises at least one crystal phase selected from the group consisting of β-quartz, β-quartz solid solution, β-eucryptite, β-eucryptite solid solution, β-spodumene and β-spodumene solid solution.

2. Glass-ceramics as defined in claim 1 wherein the glass-ceramics is capable of having logarithm (logη) of viscosity η(dPa·s) of 3.0 or below when the glass-ceramics are heated to 1400° C.

3. Glass-ceramics as defined in claim 1 wherein average coefficient of linear thermal expansion within temperature range between 25° C. and 100° C. is −10 to 50 ($10^{-7}$° $C.^{-1}$).

4. Glass-ceramics as defined in claim 1 wherein average crystal grain diameter of the crystal phase is 1 μm or below.

5. Glass-ceramics as defined in claim 1 having Young's modulus of 90 GPa or over.

6. Glass-ceramics as defined in claim 1 having ratio E/ρ of Young's modulus E to specific gravity ρ of 32 or over.

7. Glass-ceramics as defined in claim 1 comprising, in mass % on oxide basis:

| | |
|---|---|
| $Li_2O$ | 4-15% and |
| $Al_2O_3$ | 15-30%. |

8. Glass-ceramics as defined in claim 7 further comprising, in mass % on oxide basis, one or more components selected from:

| | |
|---|---|
| CaO | 0-10%, |
| ZnO | 0-10%, |
| BaO | 0-7%, |
| $P_2O_5$ | 0-15%, |
| $ZrO_2$ | 0-5%, |
| $B_2O_3$ | 0-5%, | one or more oxides selected from $Gd_2O_3$, $La_2O_3$, $Y_2O_3$ and $Ga_2O_3$ in total amount of 0-10%, and
one or both of $Sb_2O_3$ and $As_2O_3$ in total amount of 0-2%.

9. A substrate of a magnetic information storage medium using the glass-ceramics as defined in claim 1.

10. A substrate of a magnetic information storage medium having a compressive stress layer on the substrate as defined in claim 9.

11. A substrate as defined in claim 10 wherein the compressive stress layer is formed by substituting by a cation having a larger ionic radius than ions contained in a surface of the substrate.

12. A substrate as defined in claim 10 wherein the compressive stress layer is formed by heating and subsequent quenching of the substrate.

13. A substrate as defined in claim 9 having surface roughness Ra (arithmetic mean roughness) of 3A or below.

14. A magnetic information storage medium using the substrate of a magnetic information storage medium as defined in claim 9.

* * * * *